US011659828B2

(12) United States Patent
Grimm et al.

(10) Patent No.: US 11,659,828 B2
(45) Date of Patent: May 30, 2023

(54) SYSTEMS AND METHODS FOR FLUID APPLICATION INCLUDING SECTIONED SPRAY BOOM AND SECTION CONTROL VALVES FOR SECTIONAL PRESSURE CONTROL

(71) Applicant: Capstan Ag Systems, Inc., Topeka, KS (US)

(72) Inventors: Jeffrey John Grimm, Holton, KS (US); Duane Needham, San Francisco, CA (US)

(73) Assignee: Capstan Ag Systems, Inc., Topeka, KS (US)

( * ) Notice: Subject to any disclaimer, the term of this patent is extended or adjusted under 35 U.S.C. 154(b) by 553 days.

(21) Appl. No.: 16/739,911

(22) Filed: Jan. 10, 2020

(65) Prior Publication Data
US 2020/0221682 A1   Jul. 16, 2020

Related U.S. Application Data

(60) Provisional application No. 62/790,755, filed on Jan. 10, 2019.

(51) Int. Cl.
*A01M 7/00* (2006.01)
*A01C 23/00* (2006.01)
(Continued)

(52) U.S. Cl.
CPC ......... *A01M 7/0089* (2013.01); *A01C 23/007* (2013.01); *A01C 23/047* (2013.01); *A01M 7/006* (2013.01); *B05B 9/0423* (2013.01)

(58) Field of Classification Search
CPC .... A01M 7/0089; A01M 7/006; B05B 9/0423
See application file for complete search history.

(56) References Cited

U.S. PATENT DOCUMENTS 2,768,640 A   10/1956  Zimmer
2,991,481 A   7/1961   Book
(Continued)

FOREIGN PATENT DOCUMENTS

AU   492484 B     4/1978
DE   19754373 A1  6/1999
(Continued)

*Primary Examiner* — Joseph A Greenlund
(74) *Attorney, Agent, or Firm* — Armstrong Teasdale LLP

(57) ABSTRACT

A system for applying fluid to an agricultural field includes a fluid source, a plurality of nozzles connected in fluid communication with the fluid source, and a plurality of electrically actuated valves configured to control fluid flow through the plurality of nozzles. The plurality of electrically actuated valves are divided into a plurality of groups. The system also includes a plurality of section control valves. Each section control valve is connected in fluid communication between the fluid source and a corresponding one of the groups of electrically actuated valves. Each section control valve is positionable to adjust a flow coefficient of the section control valve. The system further includes a controller configured to control the position of each section control valve to provide a predetermined flow coefficient for each section control valve based on a predetermined fluid pressure for the corresponding group of electrically actuated valves.

19 Claims, 8 Drawing Sheets

(51) Int. Cl.
*B05B 9/04* (2006.01)
*A01C 23/04* (2006.01)

(56) References Cited

U.S. PATENT DOCUMENTS

| | | | |
|---|---|---|---|
| 3,581,759 A | 6/1971 | Veale | |
| 3,726,296 A | 4/1973 | Friedland | |
| 3,747,620 A | 7/1973 | Kah, Jr. | |
| RE31,023 E | 9/1982 | Hall, III | |
| 4,530,463 A | 7/1985 | Hiniker | |
| 4,637,547 A * | 1/1987 | Hiniker | B05B 12/00 239/69 |
| 4,640,310 A | 2/1987 | Hartle | |
| 5,348,227 A | 9/1994 | Polonsky | |
| 5,460,196 A | 10/1995 | Yonnet | |
| 5,566,717 A | 10/1996 | Robert | |
| 5,636,653 A | 6/1997 | Titus | |
| 5,653,389 A * | 8/1997 | Henderson | B05B 12/12 239/69 |
| 5,704,546 A | 1/1998 | Henderson | |
| 6,126,088 A | 10/2000 | Wilger | |
| 6,178,995 B1 | 1/2001 | Ohmi | |
| 6,189,807 B1 * | 2/2001 | Miller | B05B 12/04 137/625.22 |
| 6,568,416 B2 | 5/2003 | Tucker | |
| 6,883,726 B2 | 4/2005 | Polk | |
| 7,124,964 B2 | 10/2006 | Bui | |
| 7,311,004 B2 * | 12/2007 | Giles | A01M 7/0096 239/176 |
| 7,502,665 B2 * | 3/2009 | Giles | B05B 15/50 239/69 |
| 8,019,481 B2 * | 9/2011 | Yamaguchi | G05D 11/132 700/282 |
| 8,191,795 B2 * | 6/2012 | Grimm | A01M 7/0089 239/69 |
| 8,191,798 B2 * | 6/2012 | Hahn | A01M 7/0089 239/11 |
| 8,577,560 B2 * | 11/2013 | Kawasaki | E02F 9/2075 180/65.265 |
| 8,678,025 B2 | 3/2014 | Kitt | |
| 8,751,180 B2 | 6/2014 | Lull | |
| 8,978,692 B2 | 3/2015 | Heron | |
| 9,113,591 B2 * | 8/2015 | Shivak | A01C 7/082 |
| 9,510,525 B2 | 12/2016 | Schmidt | |
| 9,635,848 B2 * | 5/2017 | Needham | A01M 7/0089 |
| 9,733,649 B2 | 8/2017 | Nagase | |
| 9,766,105 B2 * | 9/2017 | Ni | G01F 1/68 |
| 9,781,916 B2 * | 10/2017 | Preheim | B05B 12/08 |
| 9,795,977 B2 * | 10/2017 | Grimm | B05B 9/0423 |
| 10,058,879 B2 * | 8/2018 | Needham | B05B 12/004 |
| 10,219,506 B2 * | 3/2019 | Ni | A01M 7/005 |
| 10,786,826 B2 * | 9/2020 | Sullivan | A01M 7/0089 |
| 10,827,740 B2 * | 11/2020 | Wonderlich | A01M 7/0089 |
| 11,160,204 B2 * | 11/2021 | Michael | A01C 23/042 |
| 2006/0265106 A1 * | 11/2006 | Giles | A01B 79/005 700/283 |
| 2007/0204913 A1 | 9/2007 | Hanada | |
| 2008/0251600 A1 * | 10/2008 | Sorensen | A01M 7/0089 239/69 |
| 2009/0235999 A1 * | 9/2009 | Engelbrecht | F16K 31/041 137/625.46 |
| 2009/0266428 A1 * | 10/2009 | Yoshino | F16K 41/103 137/551 |
| 2014/0277780 A1 * | 9/2014 | Jensen | A01M 7/0089 700/283 |
| 2016/0175869 A1 * | 6/2016 | Sullivan | B05B 1/20 239/11 |
| 2016/0309647 A1 * | 10/2016 | Bittner | A01M 7/0089 |
| 2017/0144180 A1 | 5/2017 | Trask | |
| 2017/0348718 A1 * | 12/2017 | Preheim | A01M 7/0089 |
| 2018/0112684 A1 | 4/2018 | Mahrenholz | |
| 2018/0154384 A1 * | 6/2018 | Posselius | A01M 7/0092 |
| 2019/0022687 A1 * | 1/2019 | Brooks | A01M 7/0089 |
| 2019/0321844 A1 * | 10/2019 | Schrader | H01F 7/064 |
| 2020/0113171 A1 * | 4/2020 | Davis | A01M 7/005 |
| 2020/0221682 A1 * | 7/2020 | Grimm | A01M 7/006 |
| 2021/0219538 A1 * | 7/2021 | Krosschell | B05B 1/083 |
| 2022/0168768 A1 * | 6/2022 | Piraino | B05D 7/227 |

FOREIGN PATENT DOCUMENTS

| | | |
|---|---|---|
| EP | 2153710 B1 | 10/2012 |
| EP | 2829176 A3 | 12/2015 |
| EP | 1833295 B2 | 1/2018 |
| WO | 2006072248 A1 | 7/2006 |

\* cited by examiner

SYSTEMS AND METHODS FOR FLUID APPLICATION INCLUDING SECTIONED SPRAY BOOM AND SECTION CONTROL VALVES FOR SECTIONAL PRESSURE CONTROL

CROSS-REFERENCE TO RELATED APPLICATIONS

This application claims priority to U.S. Provisional Patent Application Ser. No. 62/790,755, filed on Jan. 10, 2019, the disclosure of which is hereby incorporated by reference in its entirety.

BACKGROUND

The present disclosure relates generally to systems and methods for applying fluid to agricultural fields and, more particularly, to an application system including a sectioned spray boom and section control valves configured to provide sectional control of fluid pressure within the spray boom.

In the agricultural industry, agricultural fluids or agrochemicals are commonly applied to plants and/or plant precursors (e.g., seeds) for a variety of reasons. For example, plants and plant precursors are often sprayed with an agricultural fluid at the time of planting to enhance germination and early development. In other applications, liquid fertilizers, pesticides, and other agrochemicals may be applied to plants or crops after planting for crop management. Agricultural fluids include, without limitation, growth promotors, growth regulators, spray fertilizers, pesticides, insecticides, and/or fungicides.

Typically, systems for applying agricultural fluids to fields include a spray boom including a plurality of nozzle assemblies for applying the fluid to a field. Typically, the agrochemical liquid is supplied by powered pumps to simple or complex orifice nozzles of the nozzle assemblies that atomize the liquid stream into spray droplets. Nozzles are often selected primarily on the desired range of flow rates needed for the job and secondarily on the range of liquid droplet size spectra and spray distribution patterns they produce. For some applications, it is desirable to regulate or control the fluid application rate (i.e., amount of fluid applied per unit area, such as an acre) and/or the fluid flow rate (i.e., volume per unit time) through the nozzle assemblies at a preset rate and/or based on user specified parameters. In some seed planting systems, for example, it may be desirable to dispense a consistent amount of fluid on or adjacent to each seed dispensed from the seed planting system.

Increasing concerns over inefficient agrochemical use, the cost of agrochemicals and inadvertent spray drift or pesticide run-off have resulted in attempts to improve the quality, precision, accuracy, and reliability of application of agrochemicals. For example, it may be desirable to vary fluid application characteristics (e.g., droplet size) based on the location of a respective nozzle assembly. This has led to increased use of individual control of spray nozzles or nozzle assemblies through use of solenoid valves. However, individual control of spray nozzles may be limited by the characteristics of the fluid provided to the spray nozzles through a spray boom. For example, some characteristics of the sprayed fluid (e.g., droplet size) are affected by the pressure of the fluid in the spray boom. Moreover, any change to the fluid in the spray boom may affect the characteristics of fluid emitted from all spray nozzles.

Accordingly, a need exists for systems and methods that improve individual control of spray nozzles and provide more precise control of the fluid emitted from the spray nozzles.

BRIEF DESCRIPTION

In one aspect, a system for applying fluid to an agricultural field includes a fluid source, a plurality of nozzles connected in fluid communication with the fluid source, and a plurality of electrically actuated valves configured to control fluid flow through the plurality of nozzles. Each valve of the plurality of electrically actuated valves is connected in fluid communication between the fluid source and a corresponding at least one nozzle of the plurality of nozzles. The plurality of electrically actuated valves are divided into a plurality of groups. The system also includes a plurality of section control valves. Each section control valve is connected in fluid communication between the fluid source and a corresponding one of the plurality of groups of electrically actuated valves. Each section control valve is positionable to adjust a flow coefficient of the section control valve. The system further includes a controller connected in communication with the plurality of section control valves and configured to control the position of each section control valve to provide a predetermined flow coefficient for each section control valve based on a predetermined fluid pressure for the corresponding group of electrically actuated valves.

In another aspect, a method for applying fluid to an agricultural field includes channeling fluid from a fluid source to a plurality of section control valves and channeling the fluid from the plurality of section control valves to a plurality of electrically actuated valves. The plurality of electrically actuated valves are divided into groups. Each section control valve is connected in fluid communication between the fluid source and a corresponding one of the groups of electrically actuated valves. The method also includes determining, using a controller, a flow coefficient of each section control valve and adjusting a position of at least one section control valve of the plurality of section control valves to adjust the flow coefficient of the at least one section control valve. The controller is configured to control the position of each section control valve based on a predetermined fluid pressure for the corresponding group of electrically actuated valves. The method also includes channeling the fluid from each section control valve to the corresponding group of electrically actuated valves. Each valve of the plurality of electrically actuated valves is connected in fluid communication between the corresponding section control valve and a corresponding at least one nozzle of a plurality of nozzles. The method further includes actuating the plurality of electrically actuated valves to allow fluid to be emitted from the plurality of nozzles.

In yet another aspect, a method for assembling a system for applying fluid to an agricultural field includes connecting a plurality of nozzles in fluid communication with a fluid source. The method also includes connecting each valve of a plurality of electrically actuated valves in fluid communication between the fluid source and a corresponding at least one nozzle of the plurality of nozzles. The plurality of electrically actuated valves are configured to control fluid flow through the plurality of nozzles. The plurality of electrically actuated valves are divided into a plurality of groups. The method further includes connecting each section control valve of a plurality of section control valves in fluid communication between the fluid source and a respective one of the plurality of groups of electrically actuated valves such that each section control valve is configured to control fluid flow to the respective group of electrically actuated valves. The method also includes connecting a controller to the plurality of electrically actuated valves and the plurality of section control valves. The controller is configured to control operation of the plurality of electrically actuated valves and the plurality of section control valves. The controller is configured to control operation of each section control valve to provide a predetermined flow coefficient for each section control valve based on a predetermined fluid pressure for the respective group.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

Corresponding reference characters indicate corresponding parts throughout the several views of the drawings.

DETAILED DESCRIPTION

Embodiments of the systems and methods described herein include a spray system with section control valves that allow fluid pressures in sections of a spray boom to be separately controlled. As a result, the systems and methods are able to provide more precise control of fluid emitted from nozzle assemblies of the spray system.

Figure 1:
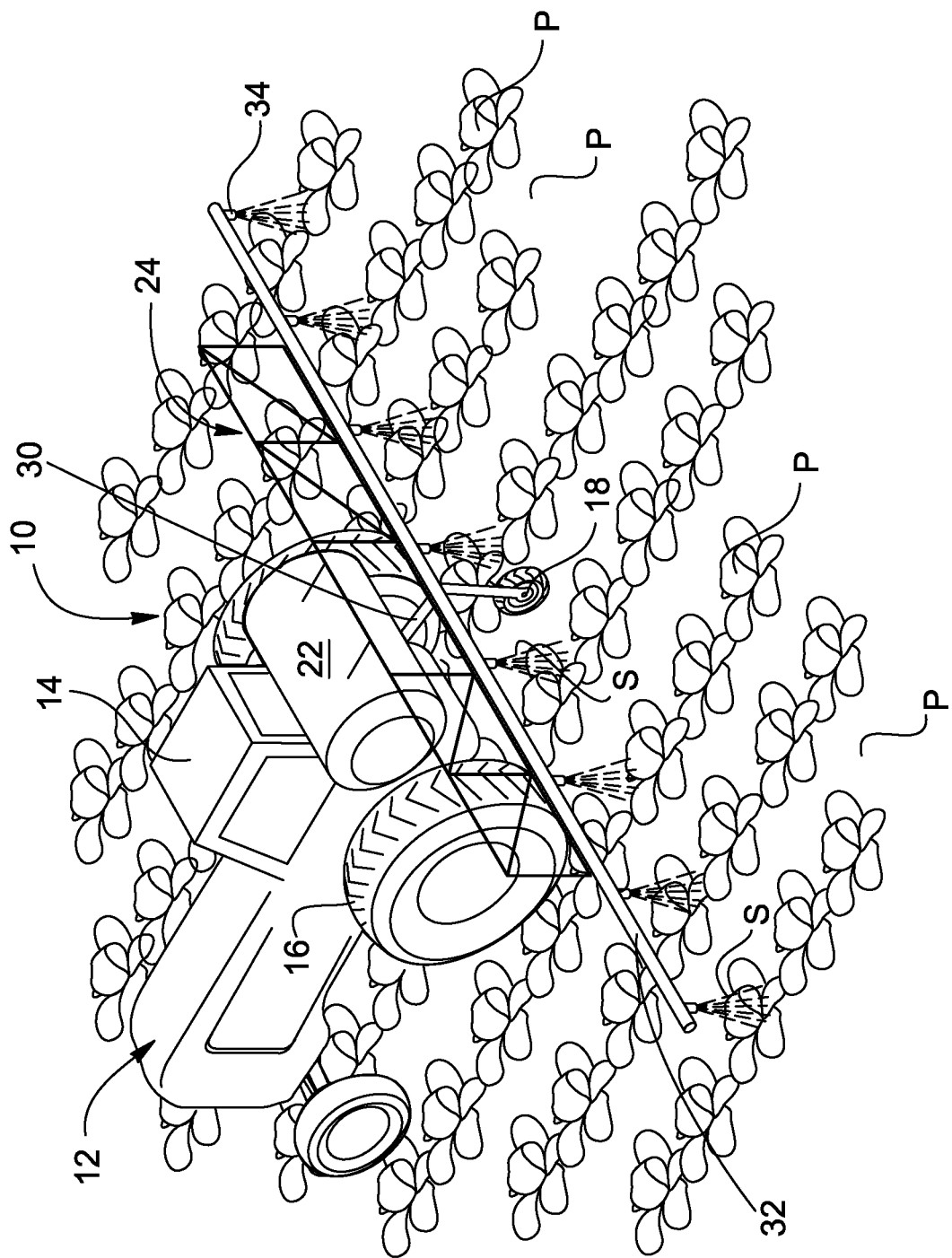
FIG. 1 is a perspective view of one embodiment of an agricultural spray system.

Referring now to the Figures, FIG. 1 is a perspective view of one embodiment of a spray system, indicated generally at 10, operatively connected to a work vehicle 12. As shown, work vehicle 12 includes a cab 14 and a plurality of wheels 16. Work vehicle 12 may in certain embodiments be an agricultural tractor having any suitable configuration. However, it should be appreciated that in other embodiments, any other suitable aero or ground means may be provided for moving spray system 10. For example, in other embodiments, work vehicle 12 may not include a cab, and instead may have any suitable operator station. In some embodiments, work vehicle 12 may be an unmanned or autonomous vehicle. Further, in some embodiments, work vehicle 12 and/or spray system 10 may include a global positioning system component 70 (e.g., a GPS receiver, shown in FIG. 4) for automated control of work vehicle 12 and/or spray system 10. In some embodiments, global positioning system component 70 (shown in FIG. 4) is used to monitor a travel speed of vehicle 12 and/or spray system 10, and/or to monitor a position of work vehicle 12 and/or spray system 10.

In the example embodiment, spray system 10 includes at least one boom wheel 18 for engaging a section of ground (generally, P) with a crop, produce, product or the like, a tank or fluid source 22, and a spray boom 24. Spray boom 24 includes a plurality of nozzle assemblies 34 attached thereto and in fluid communication with tank 22. Tank 22 holds a product S, such as a liquid, a mixture of liquid and powder, or other product. Product S may be a quantity of water or an agrochemical such as a fertilizer or a pesticide, and may be sprayed from nozzle assemblies 34 onto, for example, a crop or produce or ground P itself, as shown in FIG. 1. It should be appreciated, however, that in other embodiments, system 10 may have any other suitable configuration. For example, in other embodiments, system 10 may not include boom wheel 18 or may alternatively include any suitable number of boom wheels 18. Further, while work vehicle 12 is depicted as towing spray system 10 in the example embodiment, it should be appreciated that, in other embodiments, work vehicle 12 may transport spray system 10 in any suitable manner that enables spray system 10 to function as described herein.

The quantity of product S held in tank 22 generally flows through a conduit to nozzle assemblies 34. More specifically, in the embodiment illustrated in FIG. 1, product S flows from tank 22, through a pipe 30 to a boom pipe 32, and from boom pipe 32 to nozzle assemblies 34. In certain embodiments, nozzle assemblies 34 comprise direct acting solenoid valve equipped nozzles (see, e.g., FIG. 2) and system 10 may include a pump, transducers to measure fluid pressure and fluid flow, sectional regulating valves, and a pressure and/or flow controller (not shown in FIG. 1). If included, the pump may be positioned downstream from tank 22, upstream from boom pipe 32 and nozzle assemblies 34, and in operative communication with a controller for controlling operation thereof. The pump may be a pulse width modulation controlled pump configured to provide a desired amount of product S flow through system 10. The spray system 10 may also include a pressure or flow controller configured to vary certain operating parameters of the pump, such as the pump's pulse frequency and/or duty cycle, to obtain a desired product flow rate through system 10.

Referring still to FIG. 1, product S flows through nozzle assemblies 34 and may be applied to ground P in various ways. For example, product S may flow from nozzle assemblies 34 in a pulsed pattern. It should be appreciated that terms "pipe" and "conduit," as used herein, may mean any type of conduit or tube made of any suitable material such as metal or plastic, and moreover that any other suitable ground application devices can be added to provide varying effects of placement of product S on top or below a soil surface of ground P, such as via pipes, knives, coulters, and the like.

Figure 2:
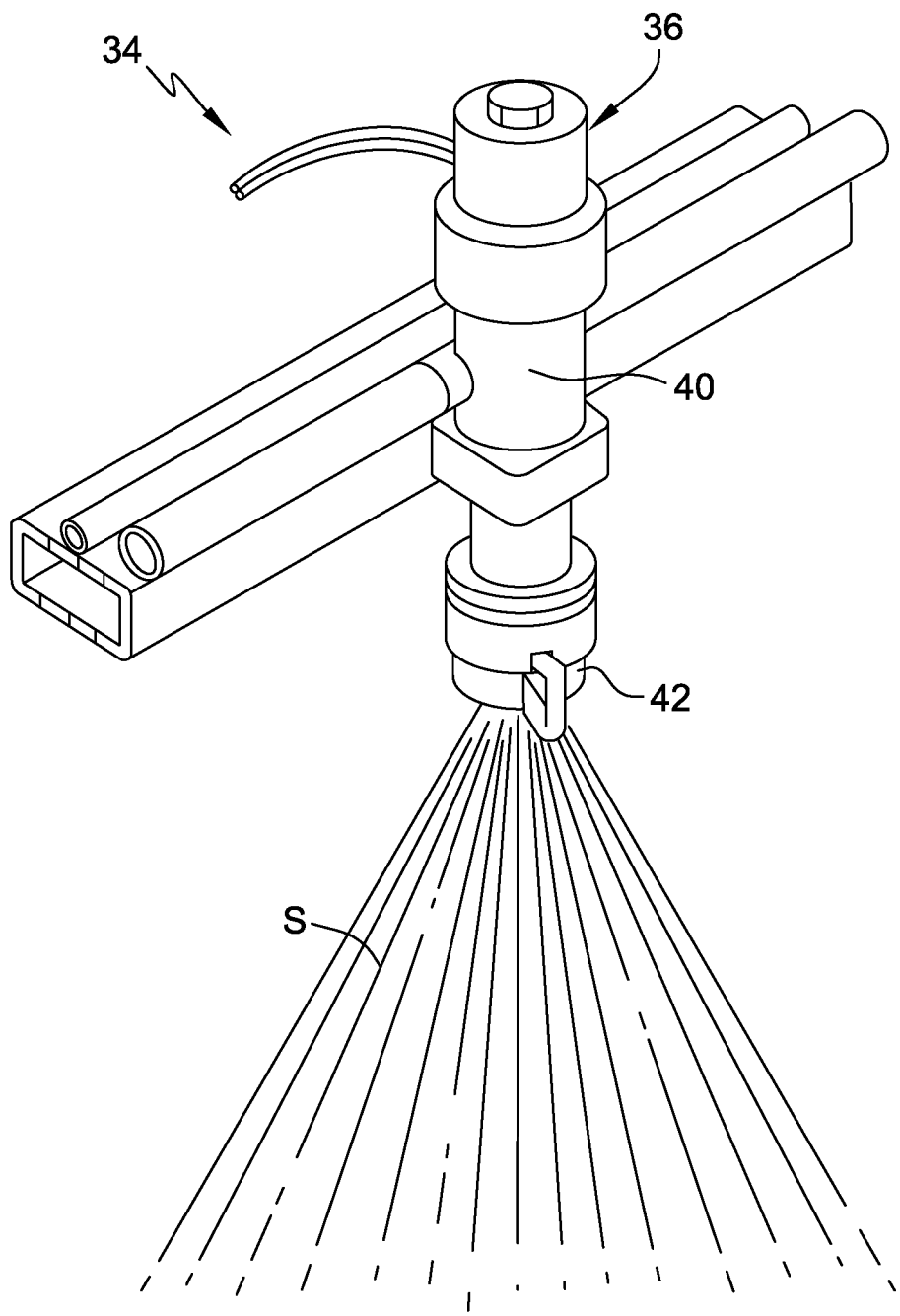
FIG. 2 is a perspective view of one embodiment of a nozzle assembly suitable for use with the agricultural spray system of FIG. 1.

FIG. 2 is a perspective view of one embodiment of a nozzle assembly 34 suitable for use with spray system 10 of FIG. 1. As shown in FIG. 2, nozzle assembly 34 generally includes a valve assembly 36, a nozzle body 40 configured to receive product S flowing through boom pipe 32 and a spray nozzle 42 mounted to and/or formed integrally with nozzle body 40 for expelling product S from nozzle assembly 34 onto crops, product and/or ground P (shown in FIG. 1).

Figure 3:
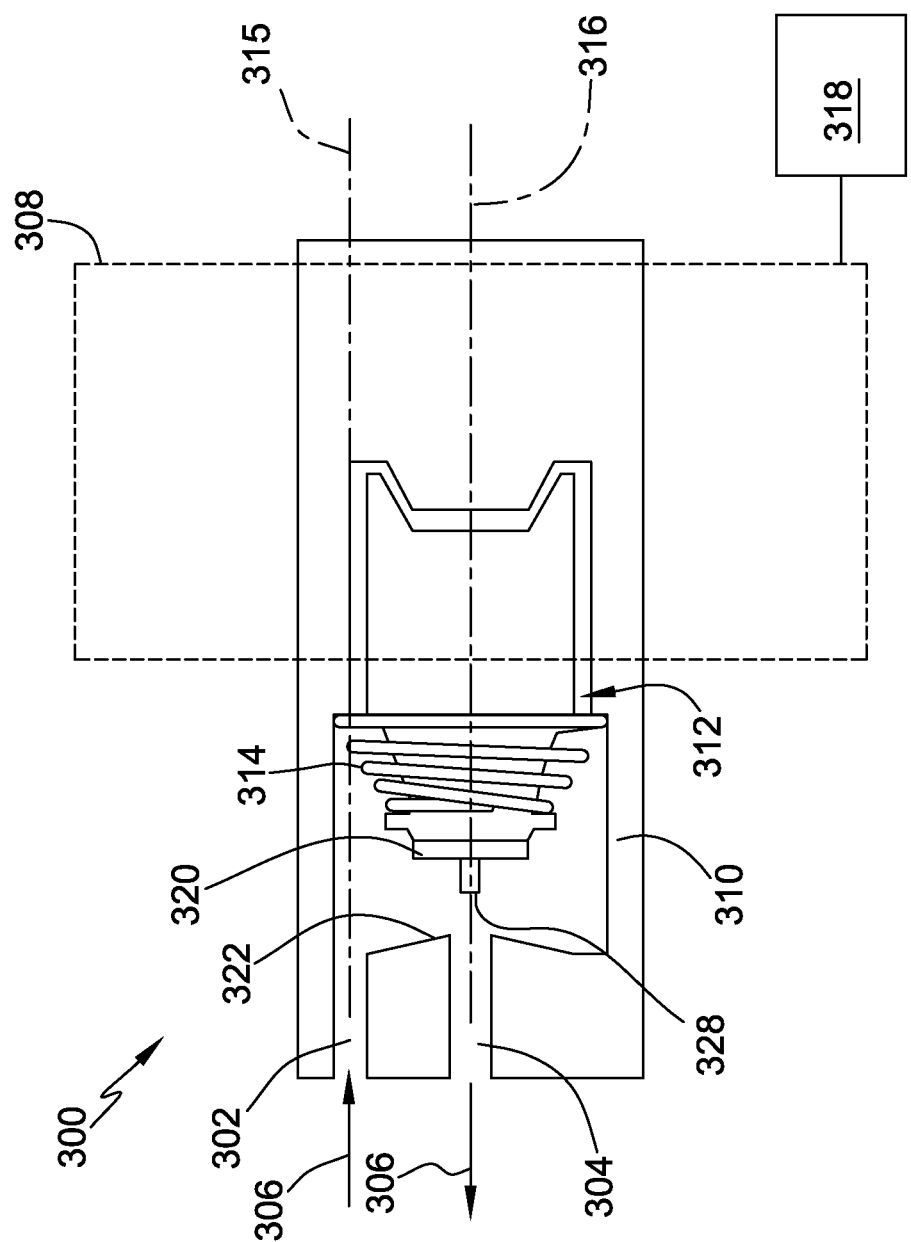
FIG. 3 is a sectional view of a portion of an example valve assembly suitable for use in the nozzle assembly shown in FIG. 2.

In some embodiments, valve assembly 36 is a solenoid valve (see, e.g., FIG. 3). For example, the solenoid valve may include a solenoid coil that is activated by electrical pulses and causes displacement of a poppet positioned within the body of the valve. A controller may control pulsing of valve assembly 36 to control flow characteristics of the fluid emitted from nozzle assemblies 34. Moreover, in some embodiments, valve assembly 36 may be configured to be mounted to and/or integrated with a portion of spray nozzle 42. In some embodiments, for example, valve assembly 36 may be mounted to the exterior of nozzle body 40, such as by being secured to nozzle body 40 through the nozzle's check valve port. Alternatively, valve assembly 36 may be integrated within a portion of nozzle body 40. In yet other embodiments, valve assembly 36 may be separate from and located remote from nozzle assembly 34.

FIG. 3 is a simplified, cross-sectional view of an example electric solenoid valve 300 suitable for use in valve assembly 36 shown in FIG. 2. In general, valve 300 includes an inlet 302 and an outlet 304 for receiving and expelling fluid 306 from valve 300. Valve 300 also includes a solenoid coil 308 (shown in dashed lines) located on and/or around a guide 310. For instance, in one embodiment, solenoid coil 308 is wrapped around guide 310. Additionally, a poppet 312 is movably disposed within guide 310. In particular, poppet 312 may be configured to be linearly displaced within guide 310 relative to inlet 302 and/or outlet 304 of valve 300. Moreover, as shown, valve 300 includes a spring 314 coupled between guide 310 and poppet 312 for applying a force against poppet 312 in the direction of outlet 304. It should be appreciated that valve 300 may also include a valve body or other outer covering (not shown) disposed around coil 308.

As shown in the illustrated embodiment, valve 300 is configured as a counter flow valve. Thus, fluid 306 may enter valve 300 through inlet 302 along an axis 315 and exit valve 300 through outlet 304 along an axis 316. Poppet 312 may be configured to be linearly displaced within guide 310 along axis 316 such that fluid 306 may generally be directed out of valve 300 along axis 316. In other embodiments, valve 300 may have any configuration that enables spray system 10 to function as described. For example, in some embodiments, valve 300 is configured as an in-line valve. In other words, fluid may be configured to enter and exit valve 300 along a common axis.

In addition, solenoid coil 308 may be communicatively coupled to a controller 318 configured to regulate or control the current provided to coil 308. Controller 318 may include one or more modules or devices, one or more of which is enclosed within valve 300, enclosed within nozzle assembly 34, or may be located remote from nozzle assembly 34. Controller 318 may generally comprise any suitable computer and/or other processing unit, including any suitable combination of computers, processing units and/or the like that may be communicatively coupled to one another (e.g., controller 318 may form all or part of a controller network). Thus, controller 318 may include one or more processor(s) and associated memory device(s) configured to perform a variety of computer-implemented functions (e.g., performing the methods, steps, calculations and/or the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit (ASIC), a digital signal processor (DSP), a field programmable gate array (FPGA), and other programmable circuits. Additionally, the memory device(s) of controller 318 may generally comprise memory element(s) including, but not limited to, non-transitory computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure controller 318 to perform various functions including, but not limited to, controlling the current supplied to solenoid coil 308, monitoring inlet and/or outlet pressures of the disclosed valve(s), monitoring poppet operation of the disclosed valves, receiving operator inputs, performing the calculations, algorithms and/or methods described herein and various other suitable computer-implemented functions.

Coil 308 may be configured to receive a controlled electric current or electric signal from controller 318 such that poppet 312 may move within guide 310 relative to outlet 304. For example, in one embodiment, controller 318 includes a square wave generator, a coil drive circuit, or any other suitable device that is configured to apply a regulated current to coil 308, thereby creating a magnetic field which biases (by attraction or repulsion) poppet 312 away from outlet 304. As a result, poppet 312 may be moved between a closed position and an opened position. Typically, when a solenoid valve is activated, i.e., opened and held open, the solenoid coil is energized continuously and, conversely, when the solenoid valve is deactivated, i.e., closed and held close, the solenoid coil is de-energized. Alternatively, the frequency and duty cycle of the current conducted through the solenoid coil may be regulated to continuously conduct current through the solenoid coil while maintaining control of the desired valve-pulsing PWM signal. In some embodiments, coil 308 may be driven with a complex pulsed voltage, or PWM waveform.

In certain embodiments, controller 318 may control the supply of current to coil 308 to move poppet 312 to a throttling position intermediate the fully-opened and fully-closed position to control the instantaneous pressure drop across valve 300. Additionally, the attraction between coil 308 and poppet 312 may also allow poppet 312 to be pulsated or continuously cyclically repositioned, thereby providing for control of the average flow rate through valve 300.

In several embodiments, when valve 300 is being pulsed, the movement of poppet 312 may be cycled between the opened position and a closed, or sealed, position, wherein poppet 312 is sealed against outlet 304. Thus, as shown in FIG. 3, poppet 312 may also include one or more rubber disks or other suitable sealing members 320 configured to be pressed against outlet seat 322 of outlet 304 to create a leak-free seal when valve 300 is in the sealed position. A projection 328 extending from sealing member 320 may be received in outlet 304 when valve 300 is in the sealed position.

Figure 4:
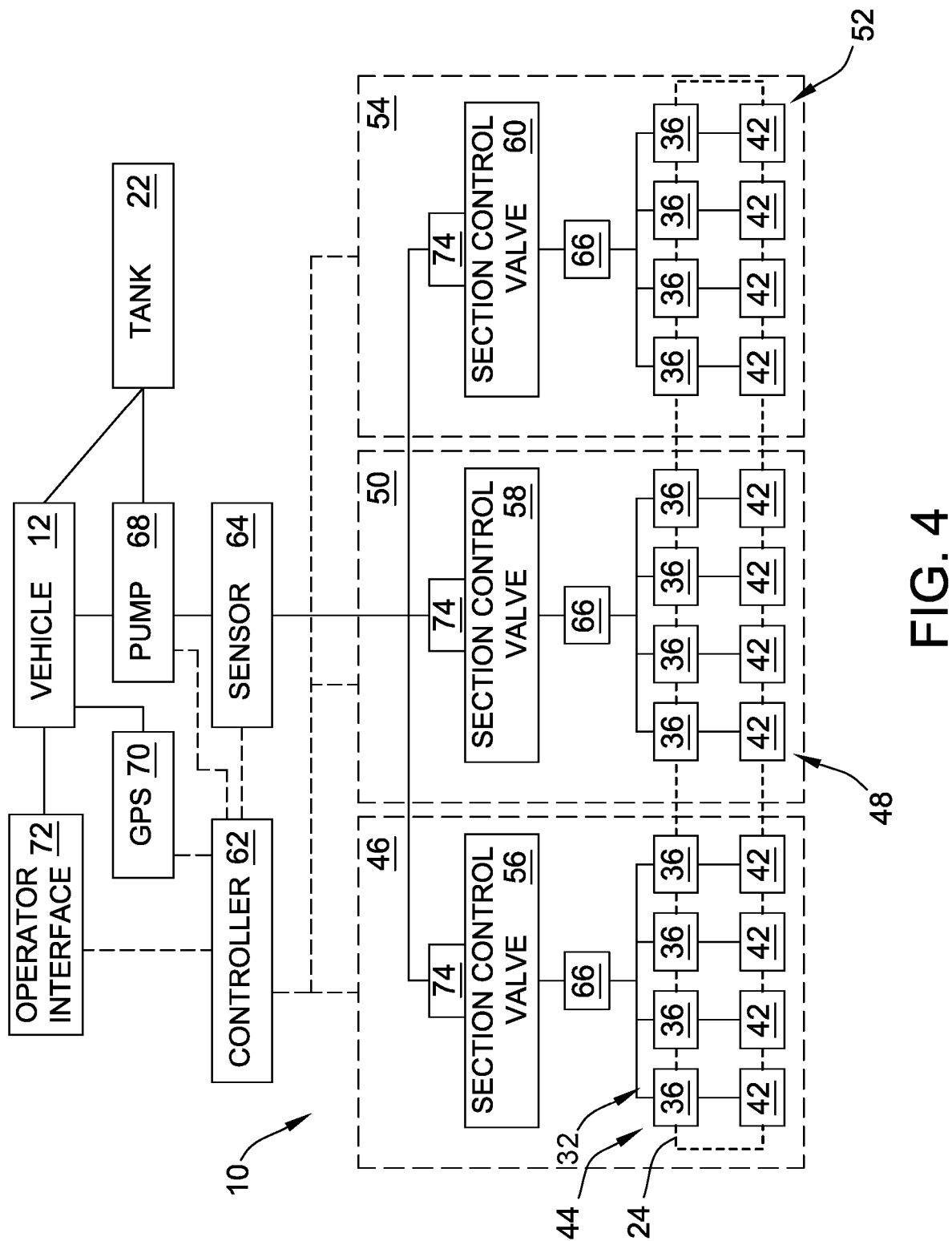
FIG. 4 is a schematic diagram of a portion of the agricultural spray system shown in FIG. 1.

FIG. 4 is a schematic view of spray system 10. As shown in FIG. 4, spray boom 24 of spray system 10 is divided into a plurality of sections 46, 50, 54. In the illustrated embodiment, first section 46 and third section 54 are on ends of spray boom 24 and, thus, are located along edges of a swath width when spray system 10 travels along a field. Second section 50 is in a center of spray boom 24 between first section 46 and third section 54 and is positioned on an interior of the swath width when spray system 10 travels along a field. In other embodiments, spray boom 24 may include any number of sections that enable spray system 10 to operate as described herein. For example, in some embodiments, spray boom 24 is divided substantially equally into two sections. In further embodiments, spray boom 24 includes four or more sections. As illustrated in FIG. 4, boom pipe 32 of spray boom 24 may be divided into a number of boom pipe sections that corresponds to sections 46, 50, 54. The sections of boom pipe 32 may be fluidly separated or isolated from one another such that fluid flowing to one section does not flow to another section. Thus, in some embodiments, boom pipe 32 may be implemented as multiple, separate boom pipes. In other embodiments, boom pipe 32 may be constructed from a single, continuous boom pipe and include suitable valves or flow restrictors to separate and fluidly isolate different boom pipe sections of boom pipe 32.

Spray system 10 includes spray nozzles 42 and valve assemblies 36 divided into groups 44, 48, 52 that correspond to sections 46, 50, 54 of spray boom 24. Specifically, in the illustrated embodiment, spray system 10 includes a first group 44 of spray nozzles 42 and valve assemblies 36 mounted on first section 46 of spray boom 24, a second group 48 of spray nozzles 42 and valve assemblies 36 mounted on second section 50 of spray boom 24, and a third group 52 of spray nozzles 42 and valve assemblies 36 mounted on third section 54 of spray boom 24. In further embodiments, valve assemblies 36 of groups 44, 48, 52 are not mounted on spray boom 24. For example, in some embodiments, valve assemblies 36 are mounted on a valve manifold separate from spray boom 24. In the illustrated embodiment, each group 44, 48, 52 includes a plurality of spray nozzles 42 and valve assemblies 36. In some embodiments, each group 44, 48, 52 includes at least ten spray nozzles 42 and ten valve assemblies 36. In other embodiments, spray nozzles 42 and valve assemblies 36 may be arranged in any groups that enable spray system 10 to operate as described herein. In some embodiments, at least one group 44, 48, 52 may include more or less than ten spray nozzles 42 and/or ten valve assemblies 36.

Spray system 10 further includes a plurality of section control valves 56, 58, 60 configured to control fluid flow from tank 22 to groups 44, 48, 52 of spray nozzles 42 and valve assemblies 36. Specifically, a first section control valve 56 is connected in fluid communication between tank 22 and electrically actuated valve assemblies 36 of first group 44. A second section control valve 58 is connected in fluid communication between tank 22 and electrically actuated valve assemblies 36 of second group 48. A third section control valve 60 is connected in fluid communication between tank 22 and electrically actuated valve assemblies 36 of third group 52. In the illustrated embodiment, spray system 10 includes one section control valve 56, 58, 60 for every section 46, 50, 54 of spray boom 24. In other embodiments, the number of section control valves 56, 58, 60 may be more or less than the number of sections 46, 50, 54. In some embodiments, at least one section control valve 56, 58, 60 may be connected in fluid communication with more than one group 44, 48, 52 of spray nozzles 42 and valve assemblies 36 and/or at least one group of spray nozzles 42 and valve assemblies 36 may be connected to more than one section control valve. In the illustrated embodiment, section control valves 56, 58, 60 are fluidly connected in parallel with one another. In other embodiments, one or more of section control valves 56, 58, 60 may be fluidly connected in series with one or more other section control valves.

In the example embodiment, the flow coefficient of each section control valve 56, 58, 60 for a given flow rate is adjustable by switching or adjusting the position of the respective section control valve. Adjusting the flow coefficients of any of section control valves 56, 58, 60 for a given flow rate changes the pressure of the fluid flowing through the section control valve 56, 58, 60 to the respective section 46, 50, 54 of spray boom 24. Accordingly, section control valves 56, 58, 60 allow the pressure of the fluid in each section 46, 50, 54 of spray boom 24 to be individually controlled. The section control valves 56, 58, 60 may include, for example and without limitation, ball valves, butterfly valves, a solenoid valve, and/or any other suitable valves. In other embodiments, spray system 10 may include any section control valves 56, 58, 60 that enable spray system 10 to operate as described herein.

A controller 62 is connected to and configured to communicate with valve assemblies 36 and section control valves 56, 58, 60. For example, controller 62 is configured to control operation of section control valves 56, 58, 60 to provide desired fluid pressures for individual sections of spray boom 24. Specifically, controller 62 is configured to adjust a position of each section control valve 56, 58, 60 to change the flow coefficient of the respective section control valve 56, 58, 60 and achieve a predetermined or target set point fluid pressure in each section 46, 50, 54 of spray boom 24. As a result, spray system 10 is able to provide improved control of the fluid emitted from individual spray nozzles 42. For example, controller 62 is configured to control operation of each section control valve 56, 58, 60 and the corresponding electrically actuated valve assemblies 36 to provide a predetermined or target set point droplet size from each group 44, 48, 52 of spray nozzles 42. Specifically, controller 62 may operate section control valves 56, 58, 60 to decrease fluid pressure within at least one section 46, 50, 54 and thereby allow an increase in the droplet size of fluid emitted from respective spray nozzles 42. In addition, controller 62 controls operation of valve assemblies 36 independently of operation of section control valves 56, 58, 60 to provide a desired flow rate for any fluid pressure provided by section control valves 56, 58, 60. In addition, controller 62 may operate section control valves 56, 58, 60 to increase fluid pressure within at least one section 46, 50, 54 and thereby allow a decrease in the droplet size of fluid emitted from respective spray nozzles 42. Moreover, controller 62 is able to operate section control valves 56, 58, 60 to provide an increase in droplet size from some spray nozzles 42 and a decrease in droplet size from other spray nozzles 42 because each section 46, 50, 54 is individually regulated by section control valves 56, 58, 60.

In suitable embodiments, controller 62 may be any controller that enables spray system 10 to function as described herein. In some embodiments, controller 62 may be the same as or integrated with controller 318 (shown in FIG. 3) for controlling valve assemblies 36. In addition, controller 62 may be connected to a plurality of sensors such as sensors 64, 66 such that controller 62 receives signals from the sensors. The sensors may send signals that include information for use in a closed-loop control of fluid pressure. For example, the sensors may send information including, without limitation, pressures, temperatures, and any other suitable characteristics of spray system 10.

Controller 62 may determine an operating parameter for each section control valve 56, 58, 60 based on information from section control valves 56, 58, 60, sensor 64, sensor 66, pump 68, global positioning system (GPS) component 70, operator interface 72, and any other component of spray system 10. For example, controller 62 may receive a position of spray system 10 from GPS component 70 and relate the position of the system to a spatial map. The spatial map, for example, can relate operating parameters of spray system 10, such as desired fluid pressures and/or droplet sizes, to locations on the spatial map. Accordingly, controller 62 may relate sections 46, 50, 54 of spray boom 24 to locations on the spatial map and control operation of each section control valve 56, 58, 60 based on the location of the respective section 46, 50, 54. In addition, controller 62 may control operation of individual valve assemblies 36 to provide a desired application rate indicated on the spatial map. For example, in some embodiments, controller 62 may determine when a section 46, 50, 54 is moving along a boundary of the agricultural field shown on the spatial map and adjust the position of the corresponding section control valve 56, 58, 60 to adjust the droplet size of fluid emitted from spray nozzles 42 in the corresponding section and/or the application rate of the fluid emitted from individual spray nozzles 42. The droplet size may be controlled using section control valves 56, 58, 60 and the application rate may be controlled by pulsing valve assemblies 36.

Moreover, controller 62 may control section control valves 56, 58, 60 to provide a desired droplet size without affecting application rate because controller 62 can control the duty cycle of valve assemblies 36 separately from section control valves 56, 58, 60 to provide the application rate. In particular, it may be desirable to decrease the relative pressure in a section 46, 50, 54 to increase droplet size and inhibit drift of the fluid when the respective section 46, 50, 54 is located near a boundary of an agricultural field. Also, it may be desirable to increase the relative pressure in a section 46, 50, 54 to decrease droplet size when the respective section 46, 50, 54 is at other locations. Accordingly, section control valves 56, 58, 60 and controller 62 provide improved control of fluid emitted from spray system 10 and more precise application of fluid from spray system 10 to agricultural fields.

Controller 62 may receive information from each section control valve 56, 58, 60 and determine a flow coefficient of the respective section control valve 56, 58, 60 based on the received information. For example, each section control valve 56, 58, 60 may include a sensor 74 that detects a position of the respective section control valve 56, 58, 60, and sends an electrical signal to controller 62 indicating the position of the respective section control valve 56, 58, 60. Sensor 74 may include an encoder, a hall-effect device, a potentiometer, and any other sensor capable of detecting a position of the section control valve.

In addition or alternatively, controller 62 may receive information from sensors 64, 66 that enables controller 62 to determine a flow coefficient of at least one section control valve 56, 58, 60. For example, sensors 64, 66 may comprise pressure sensors configured to detect a pressure of fluid flowing through spray system 10. In the illustrated embodiment, sensor 64 is positioned upstream of section control valves 56, 58, 60 and each of sensors 66 is positioned downstream from a respective one of section control valves 56, 58, 60. Each downstream sensor 66 is positioned between one of section control valves 56, 58, 60 and a corresponding group of valve assemblies 36. Sensors 64, 66 are communicatively connected to and configured to transmit to and/or receive signals from controller 62. Accordingly, controller 62 is able to determine fluid pressures upstream and downstream of each section control valve 56, 58, 60. In addition, controller 62 may determine the flow rate of the fluid supplied to each section 46, 50, 54 of spray system 10 based on operating parameters of spray system 10 including, for example and without limitation, application rate set-point, section width, section speed, spray nozzle size, and/or information from one or more sensors. Controller 62 may determine an operating parameter of each section control valve 56, 58, 60, such as a flow coefficient, based on the upstream and downstream fluid pressures and the flow rate. In other embodiments, controller 62 may determine a position and/or a flow coefficient of each section control valve 56, 58, 60 in any manner that enables spray system 10 to operate as described herein.

In one embodiment, for example, controller 62 is configured to calculate a flow coefficient using the relationship:

$$Q = C_v \sqrt{\frac{\Delta P}{SG}}$$

where Q is the volumetric flow rate (e.g., gallons per minute), $C_v$ is the flow coefficient of the orifice through which the fluid is flowing, $\Delta P$ is the pressure differential across the orifice (e.g., the section control valve), and SG is the specific gravity of the fluid.

Controller 62 may compare the flow coefficient of each section control valve 56, 58, 60 to a desired flow coefficient and, if necessary, adjust the position of one or more of section control valves 56, 58, 60 to adjust the flow coefficient of the respective section control valve 56, 58, 60. In some embodiments, controller 62 controls each section control valve 56, 58, 60 in a separate closed loop. In other embodiments, controller 62 evaluates operating parameters of the entire spray boom 24 and adjusts operation of at least one section control valve 56, 58, 60 to accommodate operating parameters in a different section 46, 50, 54 of spray boom 24. In some embodiments, controller 62 controls section control valves 56, 58, 60 in a feed forward manner in which controller 62 anticipates changes in operating parameters of spray system 10 and adjusts operation of section control valves 56, 58, 60 to accommodate the anticipated changes. As a result, controller 62 may reduce undesired fluctuations in fluid pressure and maintain the fluid pressure in each section 46, 50, 54 closer to a target fluid pressure.

In some embodiments, spray system 10 may include one or more flow control valves that are separate from section control valves 56, 58, 60 and are configured to regulate fluid flow through spray system 10. Such flow control valves may include shut-off valves that are only operable to turn off/on flow to one or more sections 46, 50, 54 of spray boom 24. In other embodiments, section control valves 56, 58, 60 may be used to turn off/on flow to at least one of sections 46, 50, 54. In further embodiments, valve assemblies 36 are used to turn off/on flow through one or more sections 46, 50, 54 of spray boom 24 and separate shut-off valves are not necessary.

In the exemplary embodiment, controller 62 may send operating parameters (e.g., fluid pressures, flow rates, operating states of valve assemblies 36, and positions of section control valves 56, 58, 60) to operator interface 72 for interpretation by an operator. Operator interface 72 may be any suitable interface that allows the operator to receive the data. For example, operator interface 72 may include a monitor mounted in vehicle 12 (shown in FIG. 1) to display the operating parameters for the operator. In further embodiments, operator interface 72 may be a mobile computing device wirelessly connected to controller 62. In suitable embodiments, operator interface 72 may allow the operator to input values and/or to control components of spray system 10. Operator interface 72 may be coupled to controller 62 such that commands from the operator interface are relayed to controller 62 and/or other components of spray system 10.

In suitable embodiments, controller 62 is connected to and configured to send signals to and receive signals from any components of spray system 10. For example, controller 62 may be connected to and configured to send signals to and receive signals from pump 68, spray boom 24, fluid storage tank 22, and/or valve assemblies 36. The signals may relate to controlling operation of any of the components connected to controller 62. In some embodiments, controller 62 controls operation of components based at least in part on inputs of the operator. In further embodiments, controller 62 may automatically control some operations of spray system 10.

Controller 62 may include a wireless transceiver that enables controller 62 to connect to devices on a wireless network, e.g., Wi-Fi. Optionally, controller 62 may include a port to allow for wired connection to devices in addition to or in place of the wireless transceiver.

Figure 5:
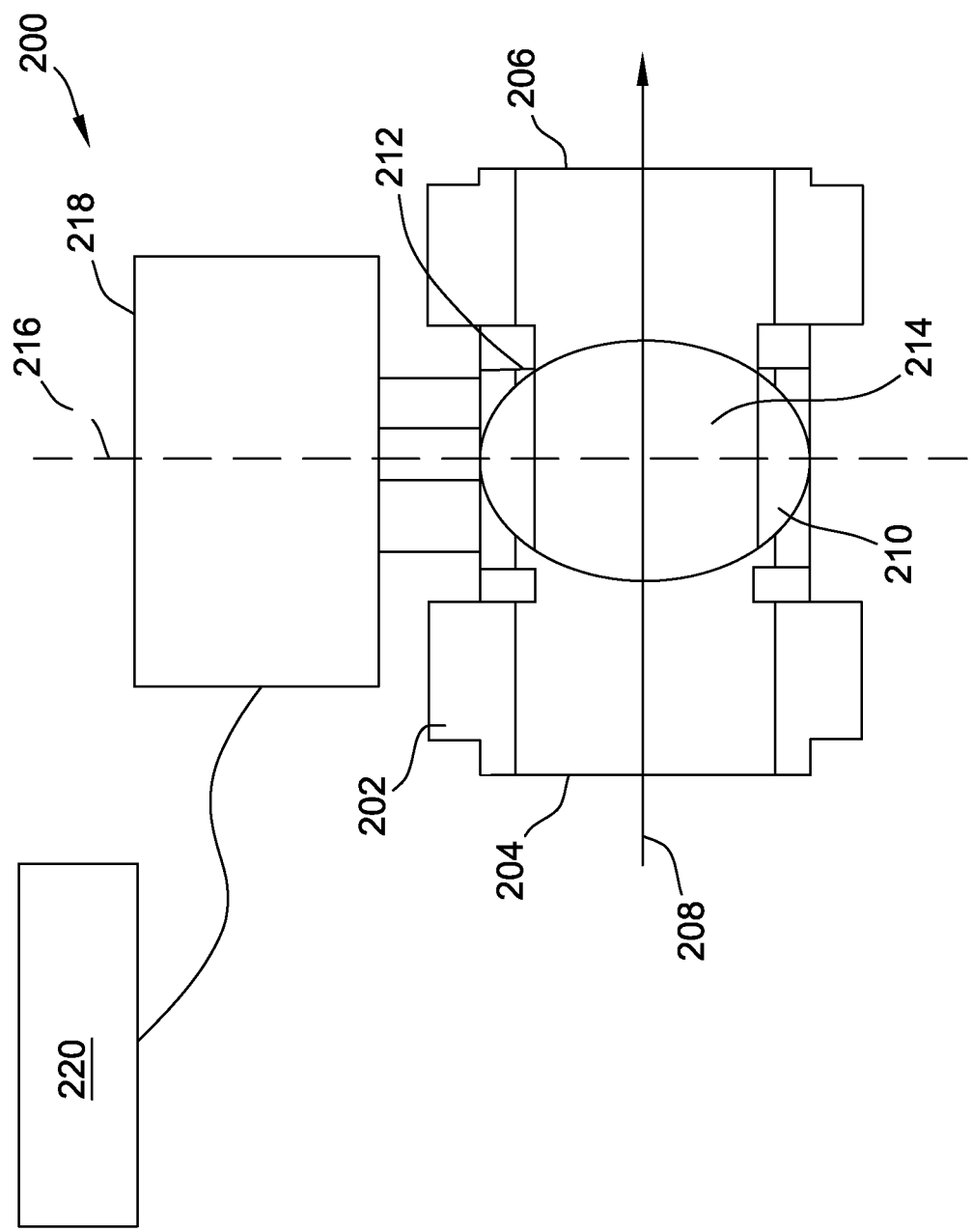
FIG. 5 is a schematic sectional view of an example section control valve suitable for use in the agricultural spray system shown in FIGS. 1 and 4.

FIG. 5 is a schematic cross-sectional view of a section control valve 200 suitable for use in spray system 10 shown in FIG. 4. In general, valve 200 includes a body 202 defining an inlet 204 and an outlet 206 for receiving and expelling fluid 208 from valve 200, respectively. Valve 200 also includes a restrictor 210 movably disposed within body 202. In particular, restrictor 210 may be configured to be rotated within body 202. In other embodiments, restrictor 210 may be moved in any manner that enables valve 200 to function as described. In the illustrated embodiment, restrictor 210 includes a cavity 214 that allows flow therethrough when valve 200 is in an opened position. When valve 200 is in a sealed position, restrictor 210 forms a seal with a portion of body 202 and prevents flow through valve 200. As shown in the illustrated embodiment, valve 200 is configured as a ball valve. In other embodiments, valve 200 may have any configuration such as a butterfly valve configuration that enables valve 200 to function as described. For example, in some embodiments, restrictor 210 rests against a seat 212 of valve body 202 and prevents flow through valve 200 when valve 200 is in a sealed position. In such embodiments, valve 200 may also include one or more rubber disks or other suitable sealing members that are configured to be pressed against seat 212 and/or restrictor 210 to create a leak-free seal when valve 200 is in the sealed position.

In addition, valve 200 is positionable in a plurality of positions between the fully opened position and the sealed position to provide different flow coefficients. For example, restrictor 210 may be rotatable about axis 216 to adjust the open area available for fluid 208 to enter and flow through cavity 214. The pressure of fluid 208 downstream of valve 200 will depend on the open area and the flow of fluid. Thus, rotation of the restrictor 210 may adjust the pressure of fluid downstream of valve 200. For example, the pressure of fluid downstream of valve 200 may be decreased by rotating restrictor 210 and decreasing the open area. The pressure of fluid downstream of valve 200 may be increased by rotating restrictor 210 and increasing the open area. In other embodiments, valve 200 may be positionable in any manner that enables valve 200 to function as described herein.

Valve 200 further includes a sensor 218 connected to restrictor 210. Sensor 218 may include an encoder, a hall-effect device, a potentiometer, and any other suitable sensor device. Sensor 218 is configured to detect a positon of restrictor 210 within body 202, such as a rotational or angular position of restrictor 210, which is directly related to the flow coefficient of valve 200. Accordingly, sensor 218 allows for the determination of the flow coefficient of valve 200 for a given flow rate. In some embodiments, sensor 218 may function as or be incorporated into an actuator that causes restrictor 210 to rotate about axis 216. In other embodiments, valve 200 may include an actuator that is separate from sensor 218 and causes rotation of restrictor 210. A controller 220 (e.g., controller 62) is coupled to sensor 218 and may receive a signal from sensor 218 indicating a position of restrictor 210. In addition, controller 220 may send a signal to valve 200 to adjust the position of restrictor 210. In other embodiments, valve 200 may be adjusted in any manner that enables valve 200 to operate as described herein.

Figure 6:
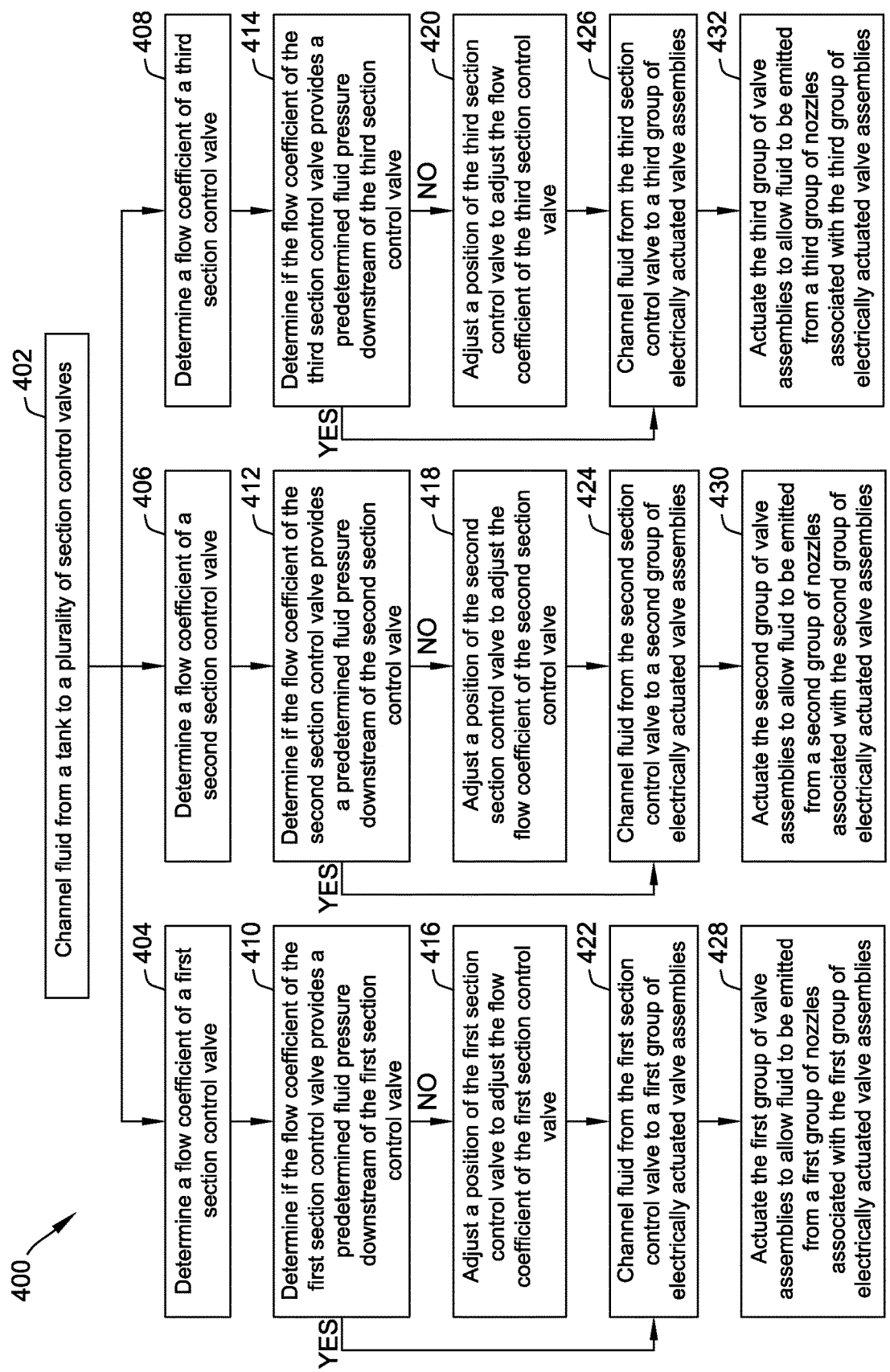
FIG. 6 illustrates a flow chart of an example method of applying fluid to an agricultural field using the spray system shown in FIGS. 1 and 4.

FIG. 6 illustrates a flow chart of an example method 400 for applying fluid to an agricultural field using spray system 10 (shown in FIGS. 1 and 4). With reference to FIGS. 1, 4, and 6, method 400 generally includes channeling 402 fluid from a tank 22 to a plurality of section control valves 56, 58, 60. For example, pump 68 may be configured to generate fluid flow from tank 22 through a conduit to section control valves 56, 58, 60. In some embodiments, sensor 64 detects a characteristic such as pressure of the fluid flowing through the conduit towards section control valves 56, 58, 60.

In addition, method 400 includes determining 404 a flow coefficient of first section control valve 56, determining 406 a flow coefficient of second section control valve 58, and determining 408 a flow coefficient of third section control valve 60. In some embodiments, controller 62 receives a signal from at least one of section control valves 56, 58, 60 indicating a position of the respective section control valve 56, 58, 60. In further embodiments, controller 62 determines the flow coefficient of at least one of the section control valves 56, 58, 60 based on a fluid pressure upstream of section control valves 56, 58, 60, a fluid pressure downstream of section control valves 56, 58, 60, and a flow rate of the fluid provided to section control valves 56, 58, 60. In other embodiments, the flow coefficient of each section control valve 56, 58, 60 may be determined in any manner that enables spray system 10 to operate as described.

Method 400 further includes determining 410 if the flow coefficient of first section control valve 56 provides a predetermined or target set point fluid pressure downstream of first section control valve 56, determining 412 if the flow coefficient of second section control valve 58 provides a predetermined fluid pressure downstream of second section control valve 58, and determining 414 if the flow coefficient of third section control valve 60 provides a predetermined fluid pressure downstream of third section control valve 60. Controller 62 is configured to adjust the flow coefficient of section control valves 56, 58, 60 if the fluid pressure provided by the current coefficient of the respective section control valve 56, 58, 60 is different from the predetermined fluid pressure downstream of the respective section control valve 56, 58, 60. For example, method 400 includes adjusting 416 a position of first section control valve 56 to adjust the flow coefficient of first section control valve 56 if the corresponding downstream fluid pressure is different from the predetermined fluid pressure, adjusting 418 a position of second section control valve 58 to adjust the flow coefficient of second section control valve 58 if the corresponding downstream fluid pressure is different from the predetermined fluid pressure, and adjusting 420 a position of third section control valve 60 to adjust the flow coefficient of third section control valve 60 if the corresponding downstream fluid pressure is different from the predetermined fluid pressure.

Method 400 also includes channeling 422 fluid from first section control valve 56 to first group 44 of valve assemblies 36, channeling 424 fluid from second section control valve 58 to second group 48 of valve assemblies 36, and channeling 426 fluid from third section control valve 60 to third group 52 of valve assemblies 36. Method 400 further includes actuating 428 first group 44 of valve assemblies 36 to allow fluid to be emitted from first group 44 of spray nozzles 42, actuating 430 second group 48 of valve assemblies 36 to allow fluid to be emitted from second group 48 of spray nozzles 42, and actuating 432 third group 52 of valve assemblies 36 to allow fluid to be emitted from third group 52 of spray nozzles 42.

Figure 7:
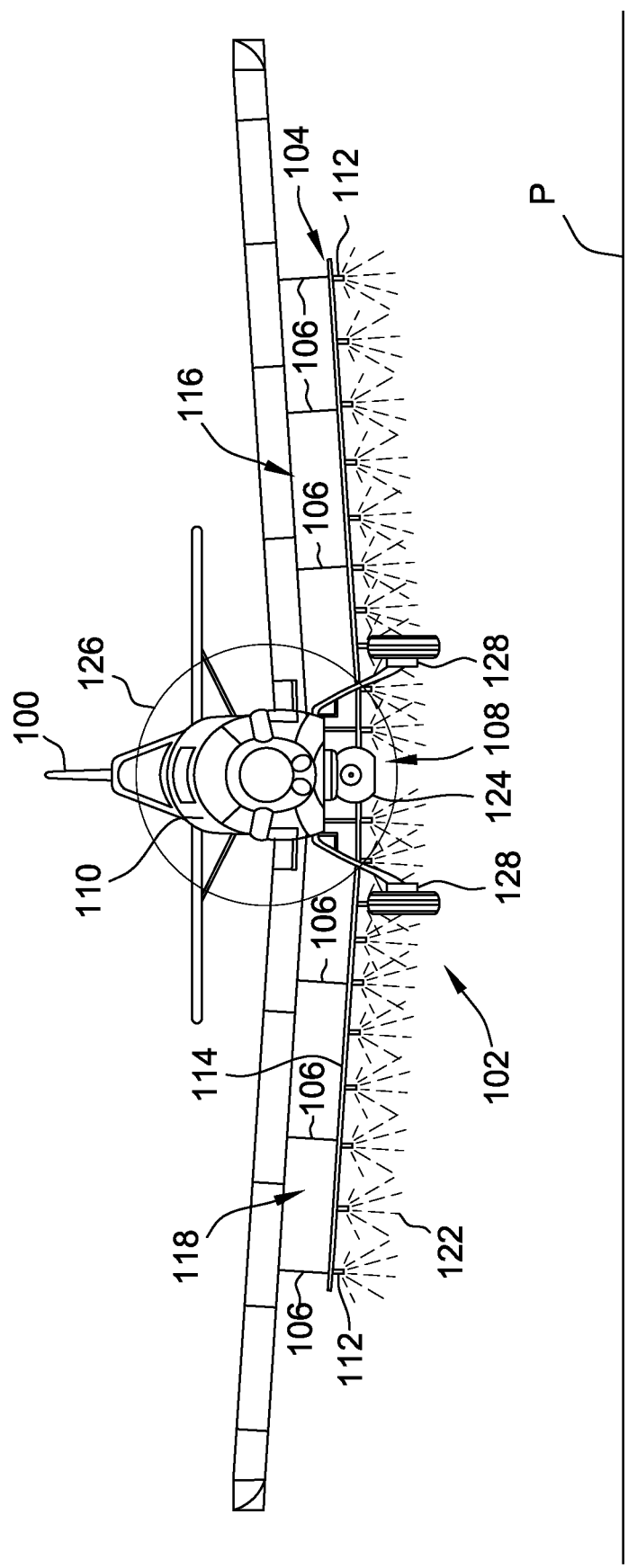
FIG. 7 is a front view of an example aerial vehicle that can be used in combination with a fluid dispersal system.

FIG. 7 is a front view of an example aerial vehicle 100 that can be used in combination with a fluid dispersal system 102. In the example embodiment, aerial vehicle 100 is a conventional fixed-wing airplane used for aerial application of materials, such as powdered or liquid insecticide or fertilizer, onto crops from the air. Although aerial vehicle 100 is shown as a low-wing airplane, aerial vehicle 100 may be any type of airplane or rotary aerial vehicle suitable for aerial application of materials onto crops, including for example, and without limitation, high-wing monoplanes, biplanes, helicopters, and the like. In some embodiments, aerial vehicle 100 may be a drone or other unmanned aerial vehicle 100.

In the example embodiment, aerial vehicle 100 and/or fluid dispersal system 102 may include a global positioning system (e.g., a GPS receiver) for providing location and velocity information related to aerial vehicle 100 and/or fluid dispersal system 102, and/or automated control of aerial vehicle 100 and/or fluid dispersal system 102. In some embodiments, the global positioning system is used to monitor, for example, and without limitation, a speed, a height, a position, a travel direction, an ascent or descent, etc. of vehicle 100 and/or fluid dispersal system 102.

In the example embodiment, fluid dispersal system 102 is coupled to and/or integrated with aerial vehicle 100. Fluid dispersal system 102 includes a boom assembly 104 coupled to aerial vehicle 100 by one or more hangers 106, a pump assembly 108, and a fluid reservoir or fluid source 110. In the example embodiment, fluid reservoir 110 is enclosed within aerial vehicle 100. Alternatively, fluid reservoir 110 can be an external fluid reservoir coupled to a portion of the aerial vehicle. In the example embodiment, boom assembly 104 includes a plurality of nozzle assemblies 112 coupled to a manifold assembly or boom pipe 114. Nozzle assemblies 112 are coupled in flow communication with fluid reservoir 110 through boom pipe 114. Boom pipe 114 may include, for example, a left boom section 116 and a right boom section 118. In one embodiment, boom sections 116 and 118 may be defined by sets or banks of nozzle assemblies 112 defined by a programmable map loaded into a controller 120 (shown in FIG. 8). Furthermore, in some embodiments, the boom pipe 114 may include any number of boom sections in which nozzle assemblies 112 corresponding to such boom sections are controlled as a set or individually by controller 120.

Further, in the example embodiment, fluid reservoir 110 holds a quantity of material 122, such as, and without limitation, a liquid, a mixture of liquid and powder, and/or other material, to be dispensed by fluid dispersal system 102, for example, onto a crop. In some embodiments, material 122 may be water or an agrochemical such as an herbicide or a pesticide, and may be dispensed by nozzle assemblies 112 onto, for example, the crop and/or the ground P. The quantity of material 122 held in fluid reservoir 110 generally flows through boom pipe 114 to nozzle assemblies 112. More specifically, pump assembly 108 is configured to selectively draw a flow of material 122 from reservoir 110 through an inlet conduit and pressurize the flow of material 122.

Pump assembly 108 includes, for example, and without limitation, a centrifugal pump driven by a fan 124 positioned in the slipstream of a propeller 126 of aerial vehicle 100. For example, as shown in FIG. 7, pump assembly 108 is mounted to aerial vehicle 100 between landing gear 128. In alternative embodiments, pump assembly 108 is any type of pump, such as, and without limitation, a hydraulic drive pump and/or an electrically operated pump, that enables fluid dispersal system 102 to function as described herein. For example, in some embodiments, pump assembly 108 is a high pressure pump capable of pressurizing material 122 to pressures in the range between about 100 pounds per square inch (psi.) and about 400 psi. In other examples, pump assembly 108 may include more than one pump coupled in serial arrangement to facilitate increasing the pressure of material 122. In the example embodiment, pump assembly 108 is mounted to aerial vehicle 100 below reservoir 110 to facilitate the pump assembly 108 continuously receiving material 122 from reservoir 110, i.e., to ensure pump assembly 108 remains primed.

Pump assembly 108 provides the pressurized flow of material 122 to boom pipe 114 through an outlet conduit. Pressurized material 122 flows through boom pipe 114 to nozzle assemblies 112, where it is dispersed into the air. In certain embodiments, the outlet conduit includes a metering device, such as a variable flow-area valve, for regulating the flow of material 122 to boom pipe 114.

In the example embodiment, nozzle assemblies 112 include direct acting solenoid valve equipped nozzles and are spaced apart from each other along a length of boom pipe 114. Nozzle assemblies 112 are arranged in a first group on left boom section 116 and in a second group on right boom section 118. Controller 120 (shown in FIG. 8) is coupled in communication with nozzle assemblies 112 to control operation of nozzle assemblies 112. In addition, in some embodiments, pump assembly 108 may include a pulse width modulation controlled pump that is configured to provide a desired pressure of pressurized material 122 flowing through fluid dispersal system 102. In such embodiments, pump assembly 108 may be coupled in communication with controller 120. Controller 120 may be configured to vary operating parameters of pump assembly 108, such as a pulse frequency and/or a duty cycle, to facilitate obtaining a desired pressure of material 122 in fluid dispersal system 102. In some embodiments, controller 120 may control the pitch of fan 124 of pump assembly 108 to achieve variable system pressures of material 122. In the example embodiment, material 122 flows through nozzle assemblies 112 and may be dispensed onto the crop and/or the ground P in different ways. For example, and without limitation, material 122 may be emitted from nozzle assemblies 112 in a pulsed pattern.

Figure 8:
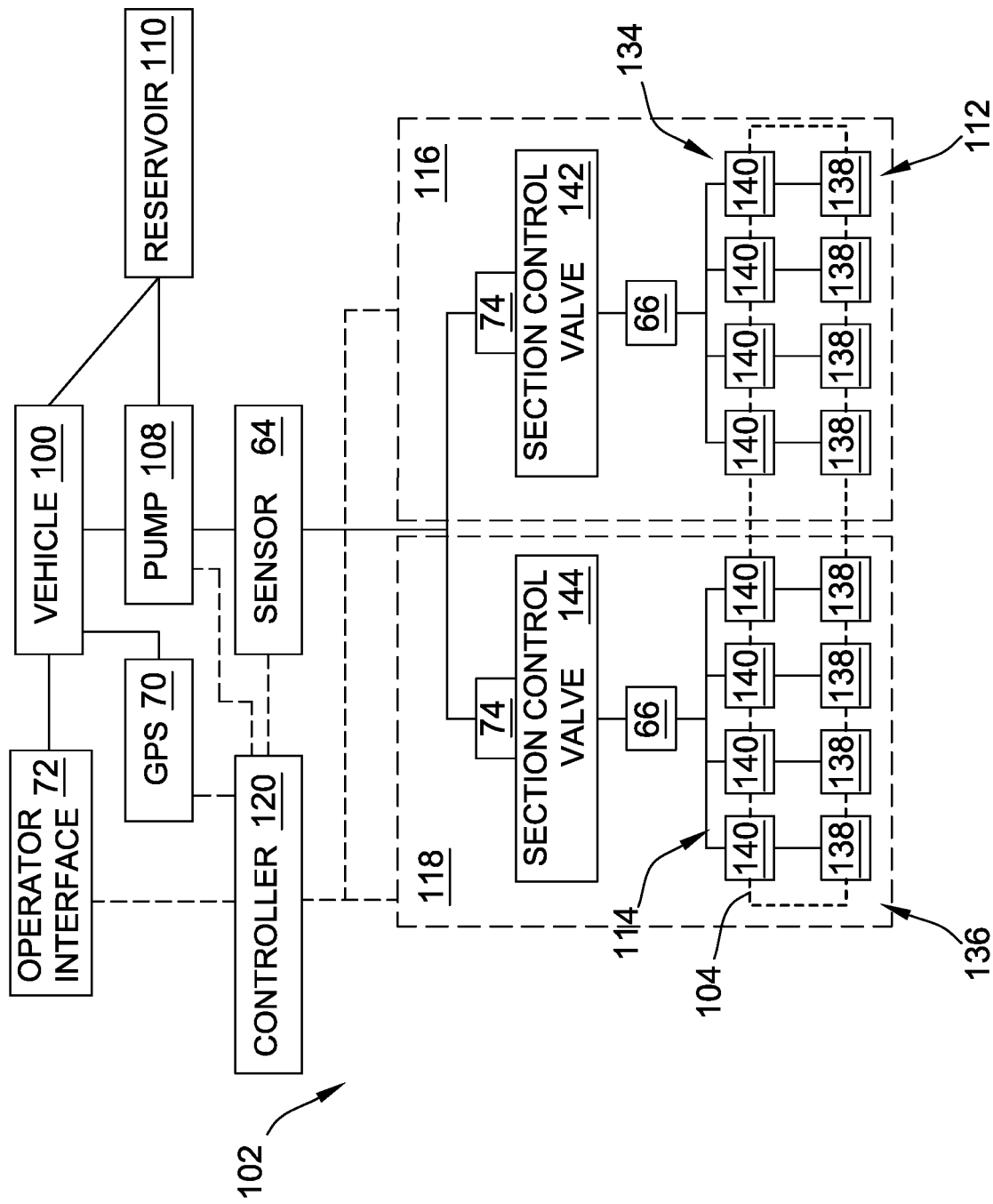
FIG. 8 is a schematic diagram of a portion of the fluid dispersal system shown in FIG. 7.

FIG. 8 is a schematic view of fluid dispersal system 102. As shown in FIG. 8, fluid dispersal system 102 may include components of spray system 10, such as sensors 64, 66, a GPS component 70, an operator interface 72, and sensors 74 to facilitate operation of fluid dispersal system 102. As further shown in FIG. 8, boom assembly 104 of fluid dispersal system 102 is divided into a plurality of sections 116, 118. In the illustrated embodiment, fluid dispersal system 102 is equally divided into first section 116 and second section 118 on opposite ends of boom assembly 104. In other embodiments, boom assembly 104 may include any number of sections that enable fluid dispersal system 102 to operate as described herein. For example, in some embodiments, boom assembly 104 is divided into three or more sections.

Fluid dispersal system 102 includes nozzle assemblies 112 divided into groups 134, 136 that correspond to sections 116, 118 of boom assembly 104. In the example embodiment, each nozzle assembly 112 includes a spray nozzle 138 and a valve assembly 140. In the illustrated embodiment, fluid dispersal system 102 includes a first group 134 of spray nozzles 138 and valve assemblies 140 mounted on first section 116 of boom assembly 104, and a second group 136 of spray nozzles 138 and valve assemblies 140 mounted on second section 118 of boom assembly 104. In further embodiments, valve assemblies 140 of groups 134, 136 are not mounted on boom assembly 104. For example, in some embodiments, valve assemblies 140 are mounted on a valve manifold separate from boom assembly 104. In the illustrated embodiment, each group 134, 136 includes a plurality of spray nozzles 138 and valve assemblies 140. In some embodiments, each group 134, 136 includes at least ten spray nozzles 138 and ten valve assemblies 140. In other embodiments, spray nozzles 138 and valve assemblies 140 may be arranged in any groups that enable fluid dispersal system 102 to operate as described herein. In some embodiments, at least one group 134, 136 may include more or less than ten spray nozzles 138 and/or valve assemblies 140.

Fluid dispersal system 102 further includes a plurality of section control valves 142, 144 configured to control fluid flow from reservoir 110 to groups 134, 136 of spray nozzles 138 and valve assemblies 140. Specifically, a first section control valve 142 is connected in fluid communication between reservoir 110 and electrically actuated valve assemblies 140 of first group 134. A second section control valve 144 is connected in fluid communication between reservoir 110 and electrically actuated valve assemblies 140 of second group 136. In the illustrated embodiment, fluid dispersal system 102 includes one section control valve 142, 144 for every section 116, 118 of boom assembly 104. In other embodiments, the number of section control valves 142, 144 may be more or less than the number of sections 116, 118. In some embodiments, at least one section control valve 142, 144 may be connected in fluid communication with more than one group 134, 136 of spray nozzles 138 and valve assemblies 140 and/or at least one group of nozzle assemblies may be connected to more than one section control valve. In the illustrated embodiment, section control valves 142, 144 are fluidly connected in parallel with one another. In other embodiments, one or more of section control valves 142, 144 may be fluidly connected in series with one or more other section control valves.

In the example embodiment, the flow coefficient of each section control valve 142, 144 for a given flow rate is adjustable by switching or adjusting the position of the respective section control valve. Adjusting the flow coefficients of any of section control valves 142, 144 for a given flow rate changes the pressure of the fluid flowing through the section control valve 142, 144 to the respective section 116, 118 of boom assembly 104. Accordingly, section control valves 142, 144 allow the pressure of the fluid in each section 116, 118 of boom assembly 104 to be individually controlled. The section control valves 142, 144 may include, for example and without limitation, ball valves, butterfly valves, a solenoid valve, and/or any other suitable valves. In other embodiments, spray system 10 may include any section control valves 142, 144 that enable fluid dispersal system 102 to operate as described herein.

A controller 120 is connected to and configured to communicate with valve assemblies 140 and section control valves 142, 144. For example, controller 120 is configured to control operation of section control valves 142, 144 to provide desired fluid pressures for individual sections of boom assembly 104. Specifically, controller 120 is configured to adjust a position of each section control valve 142, 144 to change the flow coefficient of the respective section control valve 142, 144 and achieve a predetermined fluid pressure in each section 116, 118 of boom assembly 104. As a result, fluid dispersal system 102 is able to provide improved control of the fluid emitted from individual nozzle assemblies 112. For example, controller 120 is configured to control operation of each section control valve 142, 144 and the corresponding electrically actuated valve assemblies 140 to provide a predetermined droplet size from each group 134, 136 of spray nozzles 138. When fluid dispersal system 102 is used with aerial vehicle 100, an increased fluid pressure emitted from nozzle assemblies 112 results in a lower differential velocity of the fluid at the nozzle assemblies 112. The lower differential velocity results in an increased droplet size of fluid emitted from nozzle assemblies 112. Accordingly, controller 120 may operate section control valves 142, 144 to increase fluid pressure within at least one section 116, 118 and thereby allow an increase in the droplet size of fluid emitted from respective nozzle assemblies 112. In addition, controller 120 may operate section control valves 142, 144 to decrease fluid pressure within at least one section 116, 118 and thereby allow a decrease in the droplet size of fluid emitted from respective nozzle assemblies 112. Also, controller 120 controls operation of valve assemblies 140 independently of operation of section control valves 142, 144 to provide a desired flow rate for any fluid pressure provided by section control valves 142, 144.

The technical effects of the systems, apparatus, and methods described herein include: (a) increasing precision of fluid application to agricultural field by allowing independent control of droplet size of fluid emitted from nozzle assemblies in different sections of a spray system, (b) enabling control of droplet size of fluid emitted from nozzle assemblies and separate control of applications from individual nozzle assemblies, (b) improving control of characteristics of fluid emitted from nozzle assemblies, and (c) reducing drift and misapplication of fluid spray during application to agricultural fields.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A system for applying fluid to an agricultural field, the system comprising:

a fluid source;

a plurality of nozzles connected in fluid communication with the fluid source;

a plurality of electrically actuated valves configured to control fluid flow through the plurality of nozzles, each valve of the plurality of electrically actuated valves connected in fluid communication between the fluid source and a corresponding at least one nozzle of the plurality of nozzles, wherein the plurality of electrically actuated valves are divided into a plurality of groups;

a spray boom supporting the plurality of nozzles, wherein the nozzles are positioned on the spray boom in sections that correspond to the groups of the electrically actuated valves;

a plurality of section control valves, each section control valve connected in fluid communication between the fluid source and a corresponding one of the plurality of groups of electrically actuated valves, wherein each section control valve controls the supply of fluid to a corresponding one of the sections of the spray boom and is positionable to adjust a flow coefficient of the section control valve; and a controller connected in communication with the plurality of section control valves and configured to:
determine a flow coefficient of each section control valve;
compare the flow coefficient of each section control valve to a target flow coefficient for each section control valve, wherein the target flow coefficient for each section control valve is based on a target pressure of fluid within the corresponding section of the spray boom; and
individually adjust the position of each section control valve to provide the target flow coefficient for each section control valve based on the comparison of the flow coefficient of each section control valve to the target flow coefficient for each section control valve.

2. The system of claim 1, wherein each section control valve includes an actuator and a restrictor that is moved to adjust the position of the section control valve.

3. The system of claim 2, wherein each section control valve of the plurality of section control valves comprises a ball valve or a butterfly valve.

4. The system of claim 1, wherein each section control valve of the plurality of section control valves is configured to send a signal to the controller indicative of a position of the section control valve.

5. The system of claim 1 further comprising a pressure sensor positioned upstream of the plurality of section control valves and configured to detect a fluid pressure upstream of the plurality of section control valves.

6. The system of claim 5 further comprising a plurality of downstream pressure sensors, wherein each one of the plurality of downstream pressure sensors is positioned downstream of a corresponding one of the plurality of section control valves and is configured to detect a fluid pressure downstream of the corresponding one of the plurality of section control valves.

7. The system of claim 6, wherein the controller is configured to determine the flow coefficient of each section control valve of the plurality of section control valves based on the detected upstream and downstream fluid pressures and a flow rate of the fluid.

8. The system of claim 1 further comprising a global positioning system component configured to allow determination of a position of the system, wherein the controller is further configured to relate the position of the system to a spatial map and determine a position of each spray boom section relative to the spatial map, wherein the controller is configured to control operation of each section control valve based on the determined position of the respective spray boom section.

9. The system of claim 1, wherein each electrically actuated valve includes a solenoid coil, wherein the controller is configured to control electrical pulses to the solenoid coils to actuate the electrically actuated valves and control fluid flow to the nozzles.

10. The system of claim 9, wherein the controller is configured to control operation of each section control valve and the corresponding electrically actuated valves to provide a predetermined droplet size of fluid emitted from each nozzle of the plurality of nozzles.

11. A method for applying fluid to an agricultural field, the method comprising:
channeling fluid from a fluid source to a plurality of section control valves;
channeling the fluid from the plurality of section control valves to a plurality of electrically actuated valves, wherein the plurality of electrically actuated valves are divided into groups, and wherein each section control valve is connected in fluid communication between the fluid source and a corresponding one of the groups of electrically actuated valves, wherein each section control valve controls the supply of fluid to a corresponding section of a spray boom;
determining, using a controller, a flow coefficient of each section control valve;
comparing the flow coefficient of each section control valve to a target flow coefficient for each section control valve, wherein the target flow coefficient for each section control valve is based on a target pressure of fluid within the corresponding section of the spray boom
individually adjusting a position of each section control valve of the plurality of section control valves to provide the target flow coefficient for each section control valve, wherein the controller is configured to control the position of each section control valve based on the comparison of the flow coefficient of each section control valve to the target flow coefficient for each section control valve;
channeling the fluid from each section control valve to the corresponding group of electrically actuated valves, wherein each valve of the plurality of electrically actuated valves is connected in fluid communication between the corresponding section control valve and a corresponding at least one nozzle of a plurality of nozzles; and
actuating the plurality of electrically actuated valves to allow fluid to be emitted from the plurality of nozzles.

12. The method of claim 11, wherein determining a flow coefficient of each section control valve comprises receiving a signal from each section control valve indicating a position of the section control valve.

13. The method of claim 11 further comprising:
detecting a fluid pressure upstream of the plurality of section control valves; and
detecting a fluid pressure downstream of each section control valve.

14. The method of claim 13, wherein determining a flow coefficient of each section control valve comprises determining the flow coefficient of at least one of the plurality of section control valves based on the fluid pressure upstream of the section control valve, the fluid pressure downstream of the section control valve, and a flow rate of the fluid.

15. The method of claim 11 further comprising:
 determining a position of each spray boom section relative to a spatial map; and
 controlling, using the controller, operation of each section control valve based on the determined position of the respective spray boom section.

16. The method of claim 11, wherein each electrically actuated valve includes a solenoid coil, and wherein the controller is configured to control electrical pulses to the solenoid coils to actuate the electrically actuated valves and control fluid flow to the nozzles, the method further comprising controlling operation of each section control valve and the corresponding electrically actuated valves to provide a predetermined droplet size of fluid emitted from each nozzle of the plurality of nozzles.

17. A method for assembling a system for applying fluid to an agricultural field, the method comprising:
 connecting a plurality of nozzles in fluid communication with a fluid source, wherein the plurality of nozzles are supported on a spray boom;
 connecting each valve of a plurality of electrically actuated valves in fluid communication between the fluid source and a corresponding at least one nozzle of the plurality of nozzles, the plurality of electrically actuated valves configured to control fluid flow through the plurality of nozzles, wherein the plurality of electrically actuated valves are divided into a plurality of groups, wherein the nozzles are positioned on the spray boom in sections that correspond to the groups of the electrically actuated valves;
 connecting each section control valve of a plurality of section control valves in fluid communication between the fluid source and a respective one of the plurality of groups of electrically actuated valves such that each section control valve is configured to control the supply of fluid to a corresponding one of the sections of the spray boom and fluid flow to the respective group of electrically actuated valves, wherein each section control valve is positionable to adjust a flow coefficient of the section control valve; and
 connecting a controller to the plurality of electrically actuated valves and the plurality of section control valves, wherein the controller is configured to:
  control operation of the plurality of electrically actuated valves and the plurality of section control valves;
  determine a flow coefficient of each section control valve;
  compare the flow coefficient of each section control valve to a target flow coefficient for each section control valve, wherein the target flow coefficient for each section control valve is based on a target pressure of fluid within the corresponding section of the spray boom; and
  individually adjust the position of each section control valve to provide the target flow coefficient for each section control valve based on the comparison of the flow coefficient of each section control valve to the target flow coefficient for each section control valve.

18. The method of claim 17, wherein connecting the controller to the plurality of electrically actuated valves and the plurality of section control valves comprises connecting the controller to a solenoid coil of each electrically actuated valve, wherein the controller is configured to control electrical pulses to the solenoid coils to actuate the electrically actuated valves and control fluid flow to the nozzles, and wherein the controller is configured to control operation of each section control valve and the corresponding electrically actuated valves to provide a predetermined droplet size of fluid emitted from each nozzle of the plurality of nozzles.

19. The method of claim 17 further comprising mounting the plurality of nozzles on the spray boom in the sections that correspond to the groups of the electrically actuated valves.

* * * * *